United States Patent
Welsh

[19]

[11] Patent Number: 5,841,470
[45] Date of Patent: Nov. 24, 1998

[54] CODING AND DECODING VIDEO SIGNALS

[75] Inventor: William John Welsh, Felixstowe, England

[73] Assignee: British Telecommunications public limited company, London, England

[21] Appl. No.: 360,830

[22] PCT Filed: Jun. 29, 1993

[86] PCT No.: PCT/GB93/01352

§ 371 Date: Jan. 17, 1995

§ 102(e) Date: Jan. 17, 1995

[87] PCT Pub. No.: WO94/00951

PCT Pub. Date: Jan. 6, 1994

[30] Foreign Application Priority Data

Jun. 29, 1992 [EP] European Pat. Off. .............. 92305963

[51] Int. Cl.⁶ ....................................................... H04N 7/28
[52] U.S. Cl. .......................................... 348/397; 348/414
[58] Field of Search .................................... 348/384, 390, 348/397, 414, 422; 382/209, 217; H04N 7/28

[56] References Cited

U.S. PATENT DOCUMENTS

| | | | |
|---|---|---|---|
| 4,488,175 | 12/1984 | Netravali | 348/409 |
| 4,841,575 | 6/1989 | Welsh | 382/209 |
| 5,086,480 | 2/1992 | Sexton | 348/418 |
| 5,550,580 | 8/1996 | Zhou | 348/17 |

FOREIGN PATENT DOCUMENTS

| | | |
|---|---|---|
| 0225729 | 6/1987 | European Pat. Off. . |
| WO 88/09101 | 11/1988 | WIPO . |
| WO 90/02370 | 3/1990 | WIPO . |
| WO 92/02000 | 2/1992 | WIPO . |

OTHER PUBLICATIONS

Aizawa et al, "A Model–Based Analysis/Synthesis Image Coding Scheme", Electronics and Communications in Japan, Apr. 1, 1990, No. 4, Part I, New York, US, pp. 200–207.

*Primary Examiner*—Howard W. Britton
*Attorney, Agent, or Firm*—Nixon & Vanderhye P.C.

[57] ABSTRACT

Video signals are coded at a first relatively low frame rate. One or more portions of the image area, for example, the mouth of a person speaker: recognised by feature extractor, are coded at a higher frame rate. Preferably the second coding operates by resolving the pixel values of the image portion—considered as a vector—relative to a set or orthogonal reference vectors to produce coefficients which are then transmitted. Preferably, the feature extractor normalises the image portion as regards scaling, position and rotation and sends data on these parameters as side information.

16 Claims, 6 Drawing Sheets

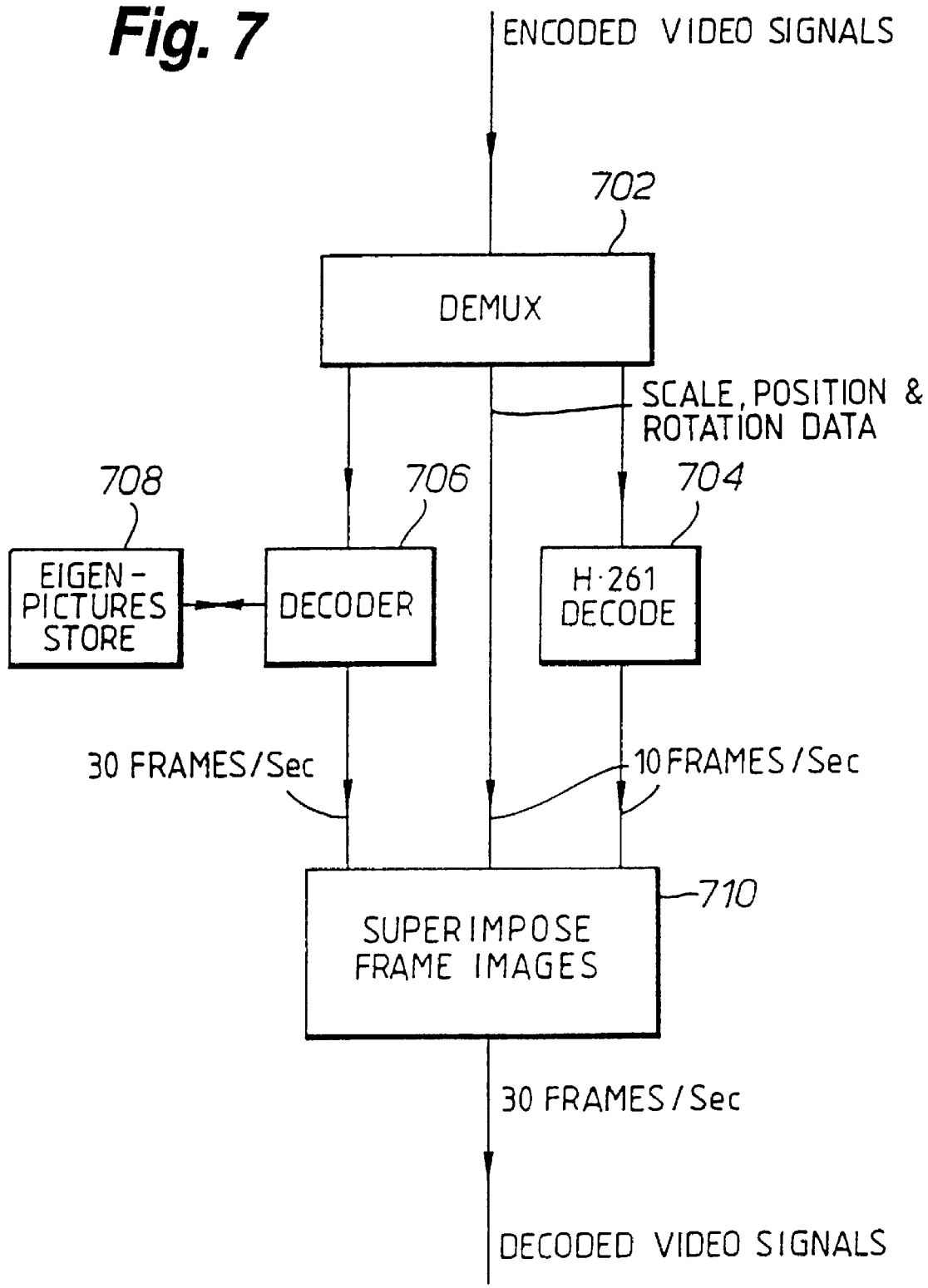

CODING AND DECODING VIDEO SIGNALS

FIELD OF THE INVENTION

This invention relates to a method of video coding in which video signals which comprise a series of frames supplied at an original frame rate are encoded by a first encoder at a first frame rate less than the original frame rate.

One application of this method of encoding video signals is in the field of videotelephony/videoconferencing over the public switched telephone network (PSTN).

BACKGROUND OF THE INVENTION

Current visual teleconferencing systems are based on the digital coding and transmission of television pictures. The user of a videotelephone is viewed by a video camera during the progress of a call, which camera outputs video signals at an original frame rate, for example in the region of 25 to 50 frames per second, to a video encoder.

In order to use low capacity digital networks for this purpose, significant compression of the image data is required. Study Group XV of the CCITT has recommended a coding scheme for low bit rate transmission of visual telephony signals at multiples of 64 kbits/s known as Recommendation H.261. This is a waveform coder and uses hybrid motion compensated interframe/DCT. H.261-based video codecs operating at 64 kbits/s are liable to produce low quality images; the frame rate is usually low and perceptually noticeable degradations occur when motion is large.

In order to avoid flicker in such low frame rate decoded moving images it is necessary to bring the display frame rate up to the order of 30 frames per second. This can be done by interpolating between the decoded frames or, more simply, by repeating a given decoded frame a number of times before refreshing the display with the next decoded frame. This technique is acceptable if the frames include moving images having little fast moving detail or fast moving detail which is of no interest to the viewer but in other cases the slow frame update can be a serious drawback.

An example of this in videotelephony applications arises with the movement of the mouth of the person speaking into the videotelephone. The mouth can make rapid excursions during speech the detail of which is lost at a coding rate of ten frames per second artificially increased in frame rate by successively repeating frames. This results in a loss of synchronisation between the lips and the speech greatly reducing the intelligibility of the transmission as the number of visual clues usually obtained from the mouth are greatly reduced.

SUMMARY OF THE INVENTION

According to a first aspect of the present invention a method of encoding video signals which comprise a series of frames supplied at an original frame rate in which the frames are encoded by a first encoder to provide a first coded output at a first frame rate less than the original frame rate is characterised in that one or more portions of the image area of the series of frames is/are encoded by a second encoder to provide a second coded output at a second frame rate greater than the first frame rate.

The first and second coded outputs can be decoded by a decoder according to a second aspect of the present invention and the resulting series of decoded images superimposed to provide a series of frames which is updated at the first frame rate with one or more selected portions updated at the second frame rate.

The portions of the series of frames may be those portions which correspond to one or more predetermined classes of image feature, for example the mouth or eyes of a human face.

Preferably, the second encoder encodes each of the portions of the series of frames by the method of principal components, the second coded output comprising a series of representative coefficients obtained from a portion of a frame corresponding to a predetermined class of image feature to be encoded and a respective reference set of vectors (eigenpictures). This provides compact coding of the portions of the frames as the principal components are of a well defined feature. If additional classes of image are also encoded by this method, each will be coded according to a respective reference set of images. The use of the principal components method for synthesising and recognising face images was suggested by Sirovich, L. and Kirby, M. in an article entitled "Low-Dimensional Prodecure for the Characterisation of Human Faces", J. Opt. Soc. Amer. A, 1987, 4, no 3, pp. 519–524.

Clearly other schemes could be used according to available bandwidth for tranmitting the second coded output, for example.

The representative coefficients may be quantised to reduce the coding overhead at the expense of an acceptable reduction in image quality.

The reference set of eigenpictures for a given class of feature may be a subset of a first set of eigenpictures derived from portions of a series of image frames again providing a reduction in the coding overhead at the expense of an acceptable reduction in image quality due to the decrease in the number of representative coefficients that need to be encoded.

The first set of eigenpictures may comprise the first number of the frames in a series of frames to be encoded for transmission. The portions corresponding to the class of feature to be encoded by the second encoder are extracted and a reference set of eigenpictures derived. These are then transmitted to the receiver where they are stored for use in subsequent decoding of later transmitted frames.

Preferably, the first set of eigenpictures comprises at least 40 eigenpictures to provide a good training set representative of the features potential excursions and the reference set of eigenpictures comprises no more than 20 eigenpictures which has been found to provide adequate quality with some reduction in the coding overhead.

In the particular case of coding a mouth in a videotelephone it has been found that the reference set of eigenpictures may preferably comprise from five to ten eigenpictures and provide sufficient detail to allow following of the mouth movements to preserve lip synchronisation with the speech transmission of the videotelephone with a full face image.

The quality of the portions encoded by the second encoder may be monitored and when the quality falls below a first threshold value, the reference set of eigenpictures modified by deriving a new set of eigenpictures from a training set expanded to include the portion in respect of which the second coder fell below the quality threshold. Thus if the initial training set of frames did not contain all the possible excursions of the feature, for example an open mouth, the training set is modified and a new reference set derived which is more able to encode such excursions in the future.

If a feature to be encoded by the second encoder is restricted to one region of the frames, by employing a fixed head position, for example, then that fixed region of the frame can always be extracted and encoded. If, however, the feature can appear in a variety of positions in the frame then the method of the present invention preferably further includes locating the predetermined class of image feature in a frame to be encoded. This improves the quality of the coding as less variation in image portion results.

For the same reason, if a feature can adopt different orientations within the frame it is preferable that the predetermined image feature located within a frame to be encoded is rotated after extraction to match a normalised position before encoding by the second encoder, the second coded output including data which characterise the rotation effected prior to encoding. Similar remarks apply to the size and position.

According to second aspect of the present invention apparatus for encoding video signals which comprise a series of frames supplied at an original frame rate, includes a first coder for encoding the frames to provide a first coded output at a first frame rate less than the original frame rate and is characterised in that there is included a second encoder for encoding one or more portions of the image area of the series of frames to provide a second coded output at a second frame rate greater than the first frame rate.

According to a third aspect of the present invention a method of decoding video signals encoded by a method according to the first aspect of the present invention includes decoding the first coded output of the first encoder at a first frame rate and decoding the second coded output from the second encoder at the second frame rate, and combining the video image decoded from the second coded output with the video image obtained from decoding the first coded output so as to provide a series of frames with one or more portions updated at a higher frame rate than the rest of the frames.

According to a fourth aspect of the present invention a decoder for decoding video signals encoded according to the first aspect of the present invention comprises a first decoder for decoding the first coded output of the first encoder at a first frame rate and a second decoder for decoding the second coded output from the second encoder at the second frame rate, and superimposing the video image decoded from the second coded output upon the video image obtained from decoding the first coded output so as to provide a series of frames with one or more portions updated at a higher frame rate than the rest of the image.

BRIEF DESCRIPTION OF THE DRAWINGS

Some embodiments of the present invention will now be described, by way of example, with reference to the accompanying drawings of which:

FIG. 7 is a block diagram of a decoder in accordance with a further embodiment of the present invention;

DETAILED DESCRIPTION OF THE DRAWINGS

Figure 1:
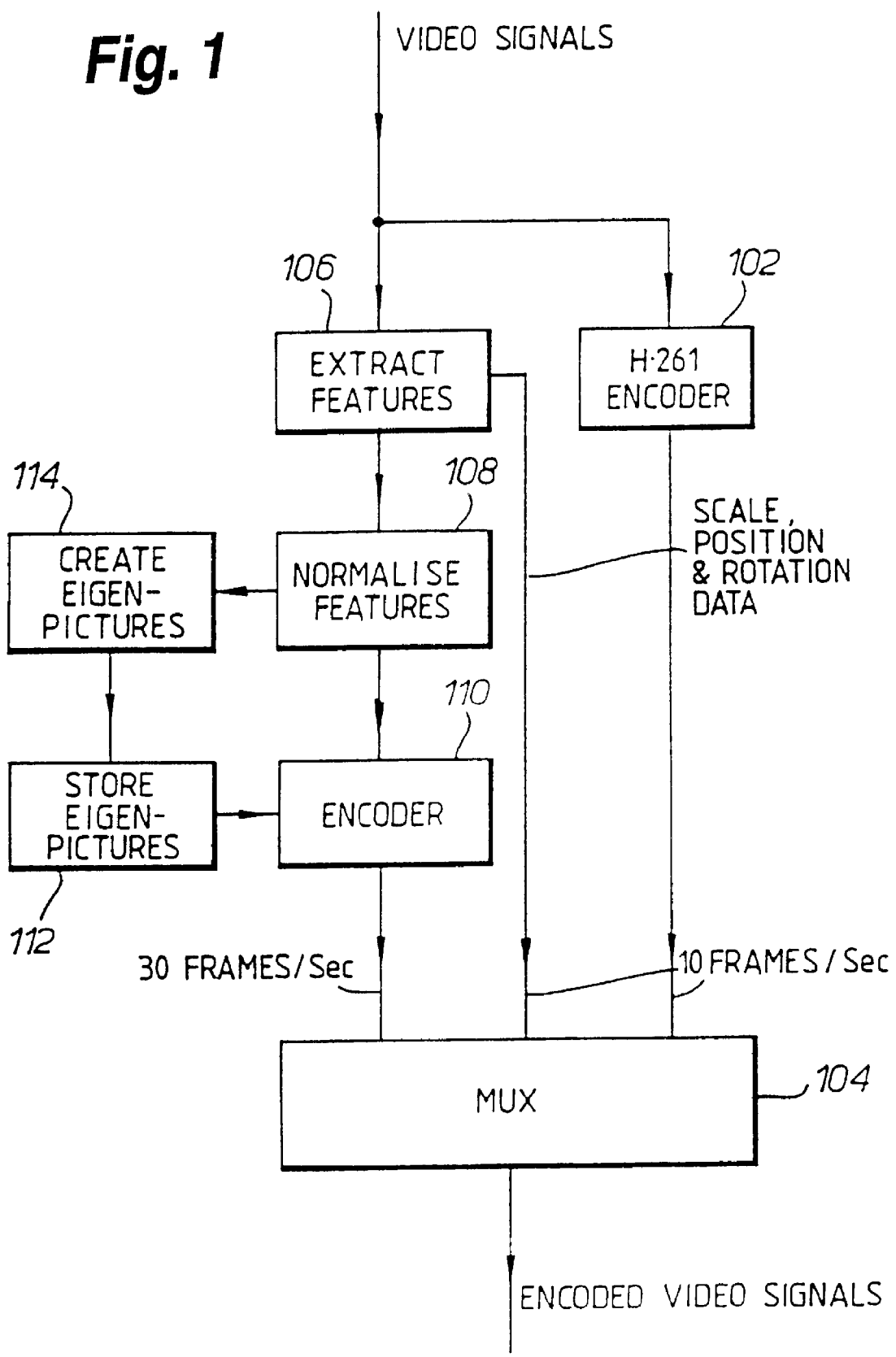
FIG. 1 is a block diagram of an apparatus for encoding an image, according to one embodiment of the present invention.

Referring to FIG. 1, a series of frames represented by video signals is encoded by the following steps. The video signals are input to a CCITT Recommendation H. 261 encoder 102 which provides a first coded video signal to a multiplexer 104. The H. 261 encoder 102 codes the video signals at a rate of ten frames per second.

The video signals are also processed by a feature extractor 106 to extract features—that is, portions of signal pertaining to one or more portions of the image area that are to be coded at a higher frame rate than ten frames per second. The extracted features are then normalised 108 in order to adjust the feature to standard size, position and orientation.

Figure 2:
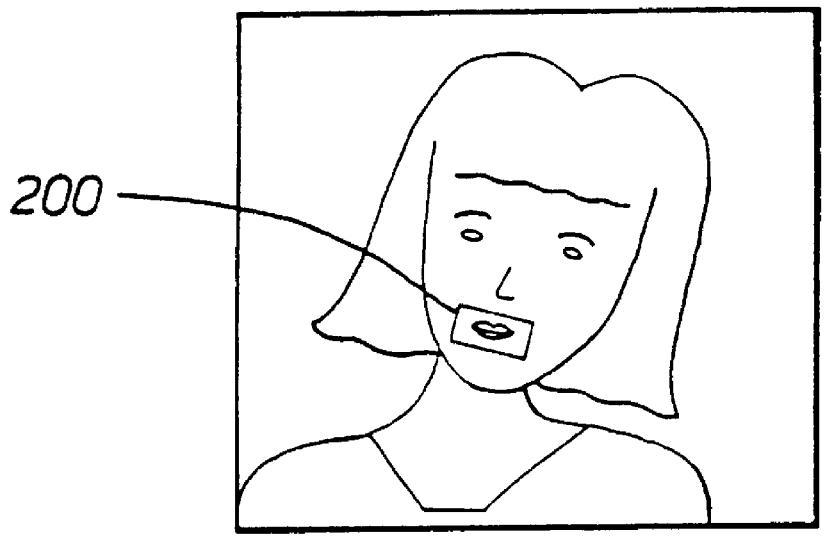
FIG. 2 is a schematic diagram showing the extraction of a mouth feature from a video image.
Figure 3:
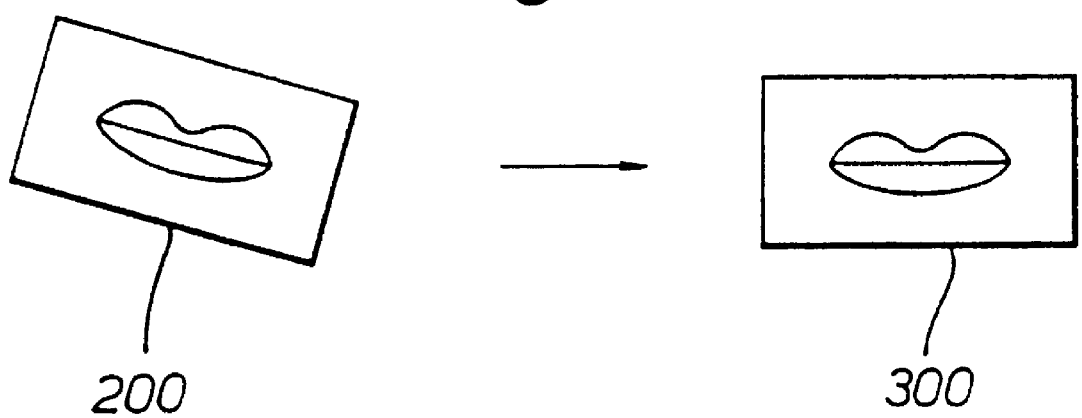
FIG. 3 is a schematic diagram showing the normalisation of the mouth of FIG. 2.

In this particular embodiment the feature extracted is the mouth from an image of a human operator of a videotelephone within an image portion 200, as shown in FIG. 2: The mouth is identified by matching a template to the feature in a known manner and can then be normalised by rotating the portion 200 until the corners of the mouth are aligned horizontally as in portion 300 as shown in FIG. 3.

The normalisation is carried out by mapping the mouth image 200 obtained from a face image to the standard horizontally oriented orientation 300 using a rotational transform. The normalised image is then filled in pixel by pixel by determining the equivalent position in the original image and then calculating the intensity for the current pixel using bilinear interpolation between the four pixels in the original image surrounding the equivalent position.

Other methods of locating, tracking and normalising image portions are described in our International Patent Applications WO88/09101 and WO92/02000. Data representing the scale, position and rotation are forwarded by the normalisation unit 108 to the multiplexer 104 at the same rate as that of the encoder 102 (i.e, in this example 10 times per second).

The normalised images of portions of the series of video frames are then coded in terms of principal components in an encoding step 110 with reference to a set of eigenpictures, as indicated by the connection between an eigenpicture store 112 and the encoder step 110.

Before the coding of normalised features can be carried out it is necessary to generate a set of eigenpictures which are to be used to code the features. The eigenpictures are calculated from a training set of mouth images such that the eigenpicture corresponding to the first representative coefficient (eigenvector) encodes the maximum variation between all the mouths of the training set of eigenpictures. Successive eigenpictures encode less and less variation.

The eigenpictures may be calculated by the following steps from M normalised mouth images each represented as a set of pixel values denoted by vectors $I_1, \ldots, I_M$.

The average mouth image vector is calculated and a set of caricatures of the mouth images are formed by subtracting the average mouth from each image in the set.

The average mouth is given by:

$$\bar{I} = \frac{1}{M} \sum_{n=1}^{M} I_n$$

and each difference image is given by:

$$\phi_n = I_n - \bar{I}, \ n=1, \ldots, M$$

This set of very large vectors is then subject to principal component analysis which seeks a set of M orthogonal vectors, $u_n$, which best describes the data. The kth vector, $u_k$, is chosen such that:

$$\lambda_k = \frac{1}{M} \sum_{n=1}^{M} (u_k^T \phi_n)^2$$

is a maximum, subject to:

$$u^T_l u_k = 0, \text{ for } 1 < k.$$

The vectors $u_k$ and scalars $\lambda_k$ are the eigenpictures and eigenvalues respectively of the covariance matrix:

$$C = \frac{1}{M} \sum_{n=1}^{M} \phi_n \phi_n^T.$$

Since the number of images in the training set is less than the dimension of the space ($M < N_h \times N_v$), where $N_h$ is the number of pixels on a line and $N_v$ the number of lines, there will only be $M$, rather than $N_h \times N_v$, non-zero eigenpictures. These $M$ eigenpictures can be found by constructing the $M$ by $M$ matrix $L$, where $$L_{mn} = \phi^T_m \phi_n$$

and finding the $M$ eigenvectors $v_l$ of $L$. Then the eigenpictures $u_k$ are given by:

$$u_k = \sum_{n=1}^{M} v_{kn} \phi_n, k = 1, \ldots, M.$$

For this training, the videotelephone operator speaks a few sample words to the instrument. Once the eigenpictures have been obtained, they are stored in a store 112, and also transmitted via the multiplexer 104.

Transmission proper can now commence. Mouth images are represented as follows. The new image I' is transformed into its eigenpicture components (by the encoder 110) by a simple operation:

$$\omega_k = u_k^t(I' - \bar{I}), k = 1, \ldots, M.$$

The pattern vector $\Omega^T = [\omega_1 \omega_2 \ldots \omega_M]$ descibes the contribution of each eigenpicture in representing the new mouth image. This vector is transmitted via the multiplexer 104 and the new image can then be synthesised at a decoder using this representative set of coefficients and the eigenpictures and is given by:

$$I' = \sum_{k=1}^{M} \omega_k u_k.$$

The amount of data transmitted by the above coding method can be reduced by quantising the representative coefficients but the amount of quantisation is limited to the degree of image quality deterioration that can be tolerated.

The quality of an output image can be measured using a fidelity criterion. A fidelity criterion employed for analyzing the coding performed by present method of the present invention is to use the peak signal to noise ratio. It can be said that the higher the value of signal to noise ratio the better the quality of the image. The formula used is:

$$(SNR)_p = 20 \times \ln(\text{square error}/\ln 10)$$

where square error=255/rms error.

Figure 4:
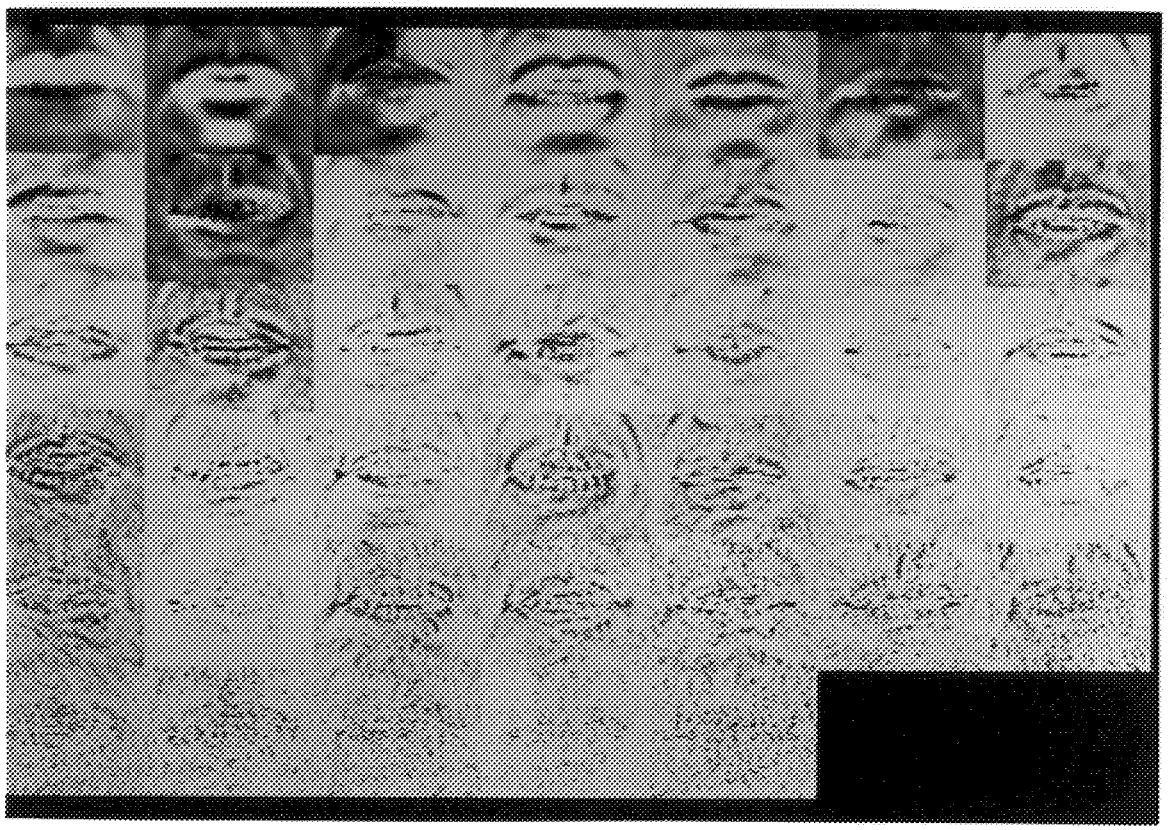
FIG. 4 is a series of photographs of eigenpictures for encoding a mouth of a human face.

A simulation of the above described method was carried out for a set of 75 frames from a sequence of 200 head-and-shoulder frames of the same subject. The first 40 mouth portions of those frames were used to produce the 40 eigenpictures 401 to 440 shown at FIG. 4 used in encoding later images of the sequence.

Figure 5:
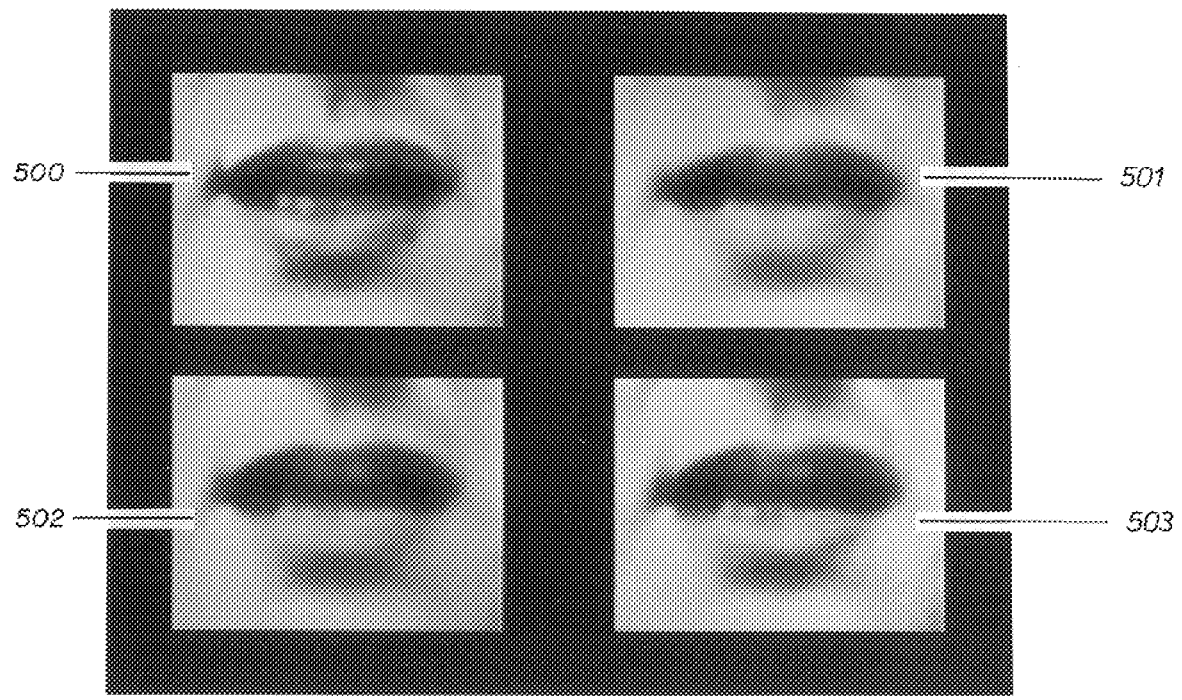
FIG. 5 is a series of decoded images of a mouth coded with differing numbers of the eigenpictures of FIG. 5.

The next images in the sequence were coded and reconstructed using the first five, ten, and 20 eigenpictures of the original 40 eigenpictures. This resulted in image sequences of varying quality and compression ratios. Table 1 gives the statistics for the three sequences and FIG. 5 shows three reconstructed images 501 to 503 of a coded mouth 500 reconstructed using five, ten and 20 eigenpictures, respectively.

TABLE 1

| Number of Eigenpictures | Average $(SNR)_p$ | Compression Ratio |
|---|---|---|
| 5 | 27.911 | 354 |
| 10 | 29.298 | 192 |
| 20 | 30.241 | 96 |

The sequence resulting from the use of ten eigenpictures was found to be of reasonable quality. From Table 1 it can be seen that the SNR ratio for a sequence obtained using 20 eigenpictures has a marginal improvement of 1dB, compared to the sequence using ten eigenpictures. No significant improvement in reproduction of the images was obtained using more than the first 20 eigenpictures.

The compression ratio for the coded sequence is found to be 192, since 96×80×8 bits were needed to code each original image by PCM (each image is 96×80 pixel resolutions and each pixel requires 8 bits) but only 320 bits are used to encode the coefficients. The compression ratios are calculated assuming floating point coefficients which implies 32 bits per coefficient on the computing system used for the work. The number of bits needed to code the image, therefore, is 32 times the number of eigenpictures. (This figure does not include the signalling of inverse rotation needed at the decoder). The compression ratio is obtained by dividing this figure by the original number of bits required, which is 96×80×8. This is quite a large intraframe compression ratio but it is also possible to quantise the coefficients of vector elements into 12 or 14 bits without a notable reduction in quality which then gives a much larger compression of 512 and 439 bits, respectively.

The signal to noise ratios, for sequences created using 12 bits or more per vector element, show no difference in their values. These and the compression ratios are listed at Table 2. It is clear that no objective improvement is obtained by using more than 12 bits per coefficient.

TABLE 2

| Number of Bits per coefficient | Quantising Levels | Compression Ratios | Average $(SNR)_p$ |
|---|---|---|---|
| 2 | 4 | 3072 | 25.485 |
| 8 | 256 | 768 | 28.671 |
| 10 | 1024 | 614 | 28.840 |
| 12 | 4096 | 512 | 29.298 |
| 14 | — | 439 | 29.298 |
| 16 | — | 384 | 29.298 |
| 32 | — | 192 | 29.298 |

An informal, subjective assessment concluded that no perceptual improvement was made using more than 10 eigen pictures and more than 12 bits per coefficient for the particular image sequence used.

Figure 6:
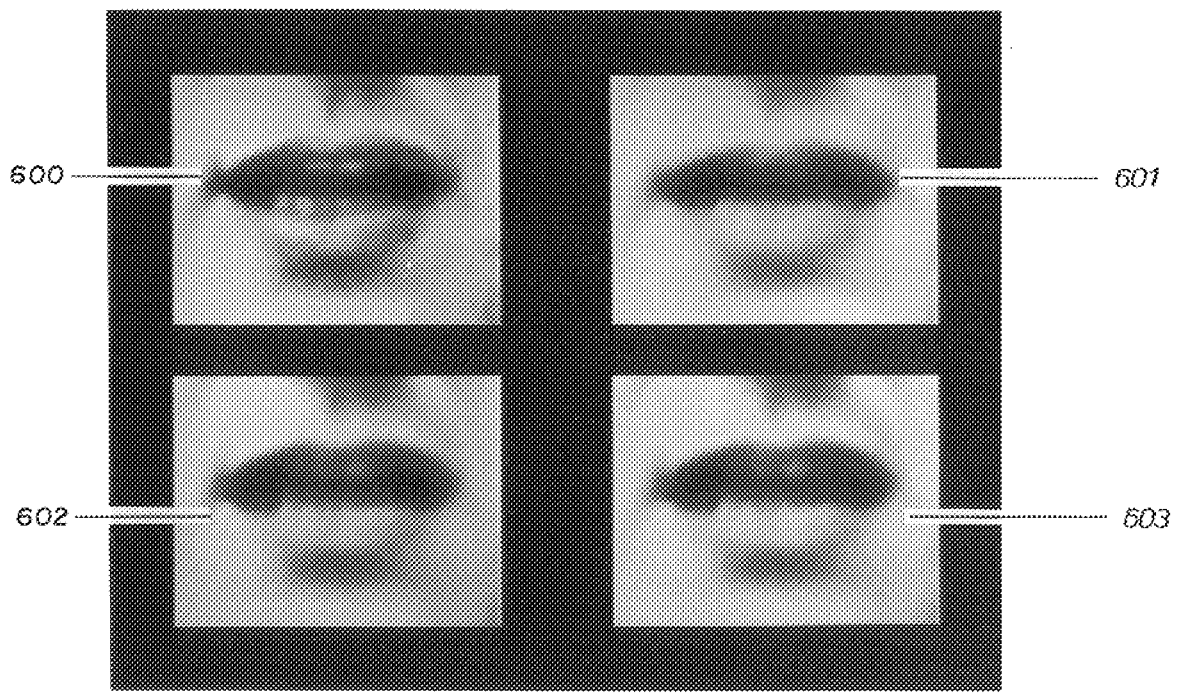
FIG. 6 is a series of decoded images of the mouth of FIG. 5 reproduced using different resolutions of coeffcients.

FIG. 6 shows the same mouth image 500 as at FIG. 5 and three mouth images 601 to 603 reconstructed using ten eigenpictures and two, ten and 12 bits for the representative coefficients, respectively.

Referring now to FIG. 7 there is shown a block diagram of a decoder for decoding video signals encoded by the encoding process described in relation to FIG. 1.

Encoded video signals are demultiplexed 702 with the data encoded by H.261 encoding step 102 of FIG. 1 being decoded 704. The coded feature portions of the encoded video signals are decoded by a second decoder 706 with reference to the reference set of supplied eigenpictures 708. The decoder 706 provides a 30 frame per second moving image of the mouth of the human operator, whereas the H.261 decoding step 704 provides a ten frame per second updated picture of the rest of the face of the videotelephone operator.

In order to achieve a 30 frame per second final output the H.261 decoded frames are repeated as necessary to achieve the desired 30 frame per second rate, whereas the mouth is updated at 30 frames per second and is superimposed on the H.261 decoded output in a combiner 710 to provide the final decoded video signals, which when displayed will show a human face the majority of which is updated at ten frames per second but with the mouth moving at a 30 frame per second update rate. The combiner 710 also receives the mouth scaling, position and rotation information so that the image portion may be correctly superimposed.

Referring again to FIG. 1, the eigenpictures can be pre-calculated and stored for use by the encoder. The preferred arrangement, however, is as shown in FIG. 1 in which when a sequence of video signals starts the first extracted normalised features are used to create eigenpictures for future encoding as shown by flow chart step 114, which eigenpictures are then stored for supply to the encoding step 110 (by the eigenpicture provision step 112).

In the decoder of FIG. 7 the decoding step 706 will, on first receiving encoded video signals, decode the eigenpictures to be used in the coding process. These eigenpictures are first stored as indicated by the arrow leading from the decoding step 706 to the eigenpicture store 708 which eigenpictures are then available for later decoding at the decoding step 706.

The accuracy to which the portions of the image frame can be coded depends upon the extent to which the eigenpictures are representative of the range of movements that are present in the image frames. If, for example, the eigenpictures were trained on a mouth which was in various closed positions only, the coding of an open mouth would not be very satisfactory. It is preferable, then, that the coder includes a local decoder (not shown in FIG. 1) for forming a decoded image and comparing it with the original video signal to derive the fidelity criterion discussed earlier; when this indicates that the current set of eigenpictures is not satisfactory, the eigenpicture set is recalculated, (and transmitted to the decoder) including in the training set the portion which was poorly coded, thus extending the range of feature characteristics that can be coded adequately by the principal components method.

An alternative approach would be to regard a closed mouth and an open mouth as distinct features. This would require some additional feature recognition steps but the feature, once identified, would be encoded by set of respective reference set of eigenpictures corresponding to the whether it was a closed or open mouth.

Similarly, different features of the human face could be separately encoded. For example, there may be sufficient spare capacity in the transmission system to accommodate coding by principal components of the eyes of the user of the videotelephone as well as the mouth therefore providing further areas of more rapidly updated image features.

The invention may also be applied to other coding situations where a more rapid update of a portion of the image is required whilst it is satisfactory to the user to have a lower frame rate refreshment of the rest of the image frame.

If the feature which requires more frequent updating is generally known and in a consistent position in the frames, a fixed portion of the image frame area can be encoded at the higher rate. Thus, for example, in a videotelephone application if the user is directed to position his or herself in front of the camera so that the mouth appears in a particular area of the frame then it is not necessary to detect where the mouth is has it can be assumed that the mouth as in a particular position. In more sophisticated systems where movement is allowed within the frame then it becomes necessary to employ image recognition techniques to identify the location of the mouth so that the minimum area is coded and that area corresponds to the desired feature.

I claim:

1. A method on encoding video signals comprising:
   providing a series of frames supplied at an original frame rate in which the frames are encoded by a first encoder
   providing a first coder output from said first encoder at a first frame rate which is less than the original frame rate
   said method further including a step wherein one or more portions of the image area of the series of frames is/are encoded by a second encoder to provide a second coded output at a second frame rate greater than the first frame rate.

2. A method of decoding video signals encoded by a method according to the method of claim 1 including decoding the first coded output of the first encoder at a first frame rate and decoding the second coded output from the second encoder at the second frame rate, and combining the video image decoded from the second coded output with the video image obtained from decoding the first coded output so as to provide a series of frames with one or more portions updated at a higher frame rate than the rest of the frames.

3. Apparatus for decoding video signals encoded by the method of claim 1 including a first decoder for decoding the first coded output of the first encoder at a first frame rate and a second decoder for decoding the second coded output from the second encoder at the second frame rate, and means for superimposing the video image decoded from the second coded output upon the video image obtained from decoding the first coded output so as to provide a series of frames with one or more portions updated at a higher frame rate than the rest of the image.

4. A method as claimed in claim 1 in which the portions of the series of frames are those portions which correspond to at least one predetermined class of image features.

5. A method as claimed in claim 4 in which at least one of the classes of image features is a feature of the human face.

6. A method as claimed in claim 5 in which the predetermined class of image features is the human mouth.

7. A method as claimed in claim 4 in which the method further includes locating a predetermined class of image feature in a frame to be encoded.

8. A method as claimed in claim 7 in which the portion corresponding to a predetermined image feature located within a frame to be encoded is rotated to match a normalised position before encoding by the second encoder, the second coded output including data which characterises the rotation prior to encoding.

9. A method as claimed in claim 1 in which the second encoder encodes each of the portions of the series of frames by comparing a set of picture element values, considered as a vector, relative to a set of reference vectors, the second coded output comprising a series of coefficients representative of the comparison.

10. A method as claimed in claim 9 in which the quality of the portions encoded by the second encoder is monitored and when the quality falls below a first threshold value, the reference set of vectors is modified by deriving a further set of vectors including the portion with respect to which the second coder fell below the threshold.

11. A method as claimed in claim 9 in which the coefficients are quantised.

12. A method as claimed in claim 9 in which encoding of the portions is preceded by a training sequence in which a set of reference vectors is derived from the input video signals and data representing the reference vectors is output.

13. A method as claimed in claim 12 in which the reference set of vectors is a subset of a first set of vectors derived from portions of a series of image frames.

14. A method as claimed in claim 12 in which the first set of vectors comprises at least 40 vectors and the reference set of vectors comprises no more than 20 vectors.

15. A method as claimed in claim 14 in which the reference set of vectors comprises between five and ten, inclusive, vectors.

16. Apparatus for encoding video signals which comprise a series of frames supplied at an original frame rate, including a first coder for encoding the frames to provide a first coded output at a first frame rate less than the original frame rate, characterised in that there is included a second encoder for encoding one or more portions of the series of frames to provide a second coded output at a second frame rate greater than the first frame rate.

\* \* \* \* \*